A. MACLACHLAN.
PROCESS OF TREATING WASTE ORGANIC SUBSTANCES.
APPLICATION FILED JUNE 6, 1919.
1,359,086.
Patented Nov. 16, 1920.
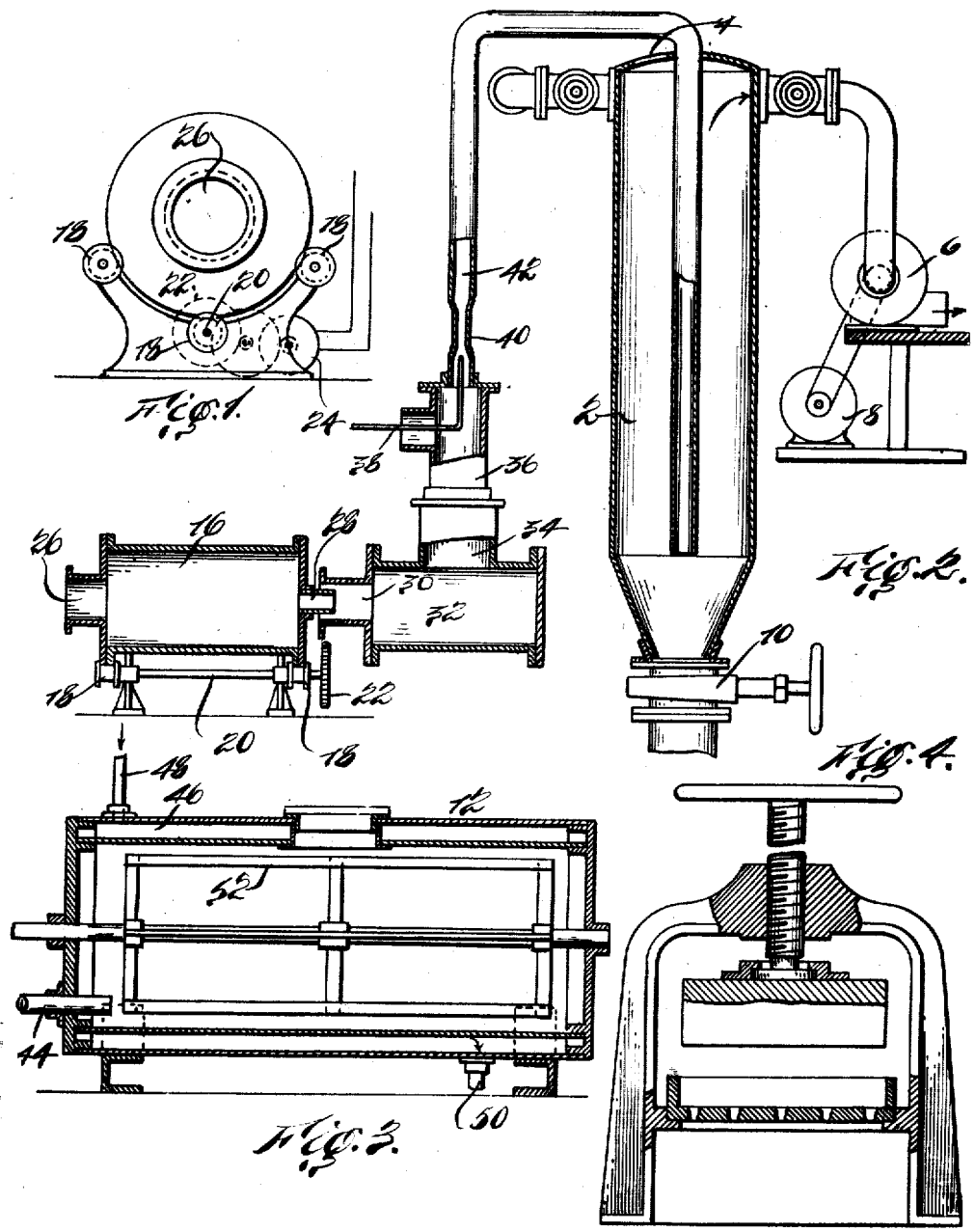
INVENTOR
Angus Maclachlan
BY
H. Dorsey Spencer
ATTORNEY

UNITED STATES PATENT OFFICE.

ANGUS MACLACHLAN, OF PERTH AMBOY, NEW JERSEY.

PROCESS OF TREATING WASTE ORGANIC SUBSTANCES.

1,359,086.  Specification of Letters Patent.  Patented Nov. 16, 1920.

Application filed June 6, 1919. Serial No. 302,243.

*To all whom it may concern:*

Be it known that I, ANGUS MACLACHLAN, a citizen of the United States, residing at Perth Amboy, New Jersey, have invented certain new and useful Improvements in Processes of Treating Waste Organic Substances, of which the following is a clear, full, and exact description.

My invention relates to a process of treating waste organic matter, such as sludge, sewage, garbage and the like, and among the objects of the invention are the more effectual and economic separation of the grease from the solid constituents of such waste organic matter; the consequent recovery of a much larger portion of the grease than has been heretofore possible, and the production of grease in which the fatty acids are set.

This application is a continuation of my application, Serial No. 263,814, filed Nov. 23, 1918, as to common subject-matter.

One of the advantages of my improved method of sludge treatment resides in the fact that very few, if any, changes need to be made in the devices which are at present used for this purpose. The present mode of treatment usually consists in a preliminary cooking or digesting of the waste organic substances to be reduced, followed by pressing and drying of said substances. Prior to the drying process, however, on account of the fact that so large a quantity of grease remains, the resulting cake after being pressed, is usually degreased by treatment with naphtha or similar substances.

By my improved process, the residue dries out with great readiness, forming a fluffy mass practically free from grease and odorless.

An important feature of my invention is the treatment of waste organic matter with sulfur dioxid, which is mixed with steam and passed through the matter to be treated. Another important feature of my invention consists in the treatment of the waste organic matter with sulfur dioxid mixed with steam, and after treatment the subjecting of the matter to further treatment with dry sulfur dioxid. Other objects and important features of the invention will appear from the following description and claims when taken in connection with the accompanying drawings, which show the apparatus for carrying out my process in a more or less diagrammatic manner.

In said drawings, Figure 1 is an end elevation of the cylinder in which sulfur is burned to form the $SO_2$;

Fig. 2 shows the complete apparatus more or less diagrammatically;

Fig. 3 shows a conventional drier; and

Fig. 4 a conventional press.

Referring to the drawings, 2 indicates a tank which may be of any suitable construction, but preferably I use a tank of substantially cylindrical form, and in fact such tank may be that which is usually used for cooking or digesting waste organic substances. These substances may be introduced at the top of the tank through an opening 4.

When the tank has been sufficiently charged with the waste organic matter to be treated, I introduce therein hot sulfurous acid which intimately mixes with the tank contents. This sulfurous acid may be introduced under pressure or it may be drawn through the matter by creating a partial vacuum by means of a fan shown at 6, which fan may be driven by a motor 8. In processes used as at present, the matter to be treated is usually subjected to a digesting or cooking process, after which it is drawn off and pressed, the grease being removed by further treatment, either by naphtha or otherwise, which is quite expensive and which furthermore does not result in a product which is satisfactory, the product containing in its final stage considerable grease and also fatty acids which are objectionable.

With my new method of treatment, the preliminary cooking or digesting may be done in the usual manner and the same apparatus used for this purpose may be used in carrying out my process, either unaltered or with slight changes. All that is necessary is to supply an extra pipe in some cases for the introduction of the sulfurous acid, or the same pipe which supplies the steam for the cooking process may be disconnected from the steam supply and connected to the sulfurous acid supply. My process differs from processes at present in use in that the material after being digested is subjected to the action of sulfurous acid, this being supplied in a particular manner, namely, by aspirating $SO_2$ by means of steam. In carrying out the process in detail, it is customary to draw off the excess water after the digesting process and also to draw off any grease which has accumulated at the top of the digester, and then the treatment with the sulfurous acid is commenced and continued until the matter has been properly reduced, this treatment varying from 25 minutes to perhaps an hour, depending upon the size of the digester and the size of the pipe admitting the sulfurous acid. After sufficient treatment and after draining off any excess water through the bottom of the tank, the more solid portion of the tank contents may be drawn off through a valve 10 and introduced either directly into a drier 12 or it may be subjected to a preliminary pressing prior to being introduced into the drier. Provision may be made for testing the gases emanating from the tank 2, and when $SO_2$ is present in considerable quantities, it is indicative of the fact that the process has been completed.

During the action of the $SO_2$ and steam, the materials are so changed that the grease is released and is readily extracted so that the grease content in the completed product is 1 or 2% only.

In some cases it may be desirable to subject the matter to pressing prior to its introduction into the drier, but if dry $SO_2$ is used in the drier, this preliminary pressing may in some cases be omitted, although the time consumed in drying is in such cases somewhat long. I prefer, however, to subject the tank contents, especially in the treatment of sludge, to the preliminary pressing.

In the drawings I have shown a cylinder 16 which is supported at its two ends by grooved rollers 18 and also at its lowest point. Connected with the axis 20 of these lower rollers is a gear member 22 which is connected to a motor 24 whereby the cylinder 16 is caused to slowly rotate. Crude sulfur is introduced into the cylinder and ignited, air being supplied abundantly through the opening 26. The end of the cylinder opposite the opening 26 has a reduced portion 28 which projects into a larger opening 30, in a chamber 32 into which the gases enter on their way to the tank 2. On account of the fact that the portion 28 is smaller than the opening 30, air freely enters the chamber 32 so that the sulfur is completely oxidized within the chamber 32. Said chamber is in the form of a T having an upper opening 34 into which fits the lower portion of the T member 36. A steam pipe 38 passes into the member 36, and in the particular form shown, terminates near the point 40 in the conveyer pipe 42, which conveyer pipe is slightly reduced in diameter at the portion 40. When steam is admitted into pipe 38, the $SO_2$ gas generated in the chambers 16 and 32 is aspirated into the gas conveyer 42, and if the pressure is great enough, the mixture is forced into the tank 2 and through the contents thereof. However, the pressure of steam need not be sufficient to produce a permeation of the tank contents by the mixture of gases. The fan 6 may be used to create a partial vacuum within the tank 2, thereby drawing or creating a flow of the gases through the mixture.

After the treatment of the material within the tank contents is completed as already pointed out, the contents may be pressed to remove any excess grease and water and then introduced into the drier 12, or it may be introduced directly into the drier 12. In order to facilitate the drying, especially when there has been no preliminary pressing stage in the operation, I introduce dry $SO_2$ into the drier by means of a pipe 44, the drier being otherwise of the conventional kind having a jacket 44 which is preferably heated by steam introduced through the pipe 48. Water of condensation may escape through the pipe 50. A rotary stirrer or mixer 52 may be provided.

In the particular apparatus for digesting, the steam is shown as being admitted to the $SO_2$ conveyer at a point outside of the digester. This of course is one form which the apparatus may take, but it is evident that the steam may be introduced within the digester, and in fact at a point comparatively close to the end of the conduit conveying the $SO_2$ gas.

The preliminary cooking by steam or other means may be dispensed with in some cases, although if done, the time required in the subsequent treatment with the $SO_2$ and steam would be somewhat longer. In the treatment of garbage, however, it is preferable that there be no preliminary cooking, the $SO_2$ and steam being introduced directly into the green garbage.

It is to be particularly noted that by my process, the resulting product is a fluffy mass substantially free from grease and water, and what is of great importance free from any objectionable odor as well.

Having thus described my invention, what I claim and desire to secure by Letters Patent is:

1. The process of treating waste organic matter containing a substantial quantity of fatty material, which consists in passing $SO_2$ and steam through said matter for a sufficient time and in sufficient quantity to cause a separation of the fat.

2. The process of treating waste organic matter containing a substantial quantity of fatty material, which consists in passing $SO_2$ and steam through said matter for a sufficient time and in sufficient quantity to cause a separation of the fat, drawing off the matter after treatment and subjecting it to a further treatment with dry $SO_2$.

3. The process of treating waste organic matter containing a substantial quantity of fatty material, which consists in passing $SO_2$ and steam through said material for a sufficient time and in sufficient quantity to cause a separation of the fat, drawing off the matter after treatment and pressing the same to remove the grease.

4. The process of treating waste organic matter containing a substantial quantity of fatty material, which consists in passing $SO_2$ and steam through said material for a sufficient time and in sufficient quantity to cause a separation of the fat, pressing the matter after treatment, and subjecting it to a further treatment with $SO_2$.

5. The process of treating waste organic matter containing a substantial quantity of fatty material, which consists in passing $SO_2$ and steam through said matter for a sufficient time and in sufficient quantity to cause a separation of fat, pressing the matter after treatment to remove the grease, and further subjecting it to a drying process.

6. The process of treating waste organic matter containing a substantial quantity of fatty material, which consists in passing $SO_2$ and steam through the matter for a sufficient time and in sufficient quantity to cause a separation of the fat, pressing the matter after treatment to remove the grease, subjecting the latter to a drying process and treating it with dry $SO_2$ during the drying stage of the process.

7. The process of treating waste organic matter containing a substantial quantity of fatty material, which consists in passing hot $SO_2$ through said matter in the presence of considerable water for a sufficient time and in sufficient quantity to cause a separation of the fat.

8. The process of treating waste organic matter containing a substantial quantity of fatty material, which consists in subjecting the waste matter to a preliminary boiling in the presence of considerable water, and passing hot $SO_2$ through the boiling mass for a sufficient time and in sufficient quantity to cause a separation of the fat.

9. The process of treating waste organic matter containing a substantial quantity of fatty material, which consists in passing hot $SO_2$ through said matter in the presence of considerable water for a sufficient time and in sufficient quantity to cause a separation of the fat, and subsequently pressing the matter while hot to extract the grease.

10. The process of treating waste organic matter containing a substantial quantity of fatty material, which consists in subjecting the matter to a preliminary boiling in the presence of considerable water, passing hot $SO_2$ and steam through said matter for a sufficient time and in sufficient quantity to cause a separation of the fat, drawing off the water, drawing off the tank contents, and subjecting the same to pressure while hot to remove the oil, and afterward subjecting the matter to a drying process.

Signed at New York city, N. Y., this 5th day of June, 1919.

ANGUS MACLACHLAN.